United States Patent [19]
Thompson

[11] Patent Number: 5,340,508
[45] Date of Patent: Aug. 23, 1994

[54] AERATION SYSTEM AND METHOD

[75] Inventor: Creighton R. Thompson, Mankato, Minn.

[73] Assignee: Clean-Flo Laboratories, Inc., Plymouth, Minn.

[21] Appl. No.: 140,889

[22] Filed: Oct. 25, 1993

Related U.S. Application Data

[63] Continuation-in-part of Ser. No. 979,929, Nov. 23, 1992, abandoned.

[51] Int. Cl.⁵ .................................................. B01F 3/04
[52] U.S. Cl. .................................. 261/122.1; 138/134
[58] Field of Search ........................ 261/122.1; 138/134; 405/171

[56] References Cited

U.S. PATENT DOCUMENTS

| | | | |
|---|---|---|---|
| 45,218 | 11/1864 | Beckers | 138/110 |
| 267,473 | 11/1882 | Westinghouse | 138/110 |
| 289,381 | 12/1883 | Bodifield et al. | 138/110 |
| 330,910 | 11/1885 | Levavasseur | |
| 338,310 | 3/1886 | Smith | 138/110 |
| 586,113 | 7/1897 | Bott | 138/110 |
| 1,249,038 | 12/1917 | Dabney | 138/110 |
| 1,622,397 | 3/1927 | Schlaich | 138/110 |
| 1,969,351 | 8/1934 | Caswell | 138/110 |
| 2,045,540 | 5/1938 | Debenedetti | 154/8 |
| 2,168,067 | 8/1939 | Jones | 138/134 |
| 2,176,558 | 10/1939 | Lockey | 261/122.1 |
| 2,185,741 | 1/1940 | Sorg et al. | 138/110 |
| 2,732,225 | 1/1956 | Mills | 138/134 |
| 3,015,969 | 1/1962 | Bratz | 138/133 |
| 3,073,351 | 1/1963 | Nichols | 138/131 |
| 3,311,133 | 3/1967 | Kinander | 138/136 |
| 3,506,040 | 4/1970 | Everling et al. | 138/134 |
| 3,610,289 | 10/1971 | Moss | 138/110 |
| 3,687,169 | 8/1972 | Reynard | 138/134 |
| 3,911,068 | 10/1975 | Hamilton | 261/122.1 |
| 4,403,631 | 9/1983 | Abdullaev et al. | 138/134 |
| 4,739,800 | 4/1988 | Baratella | 405/171 |
| 4,842,732 | 6/1989 | Tharp | 261/122.1 |

*Primary Examiner*—Tim Miles
*Attorney, Agent, or Firm*—Richard E. Brink

[57] ABSTRACT

An improved air transport hose for use in aeration systems for rejuvenating eutrophic bodies of water, said hose having low internal friction, sufficient weight to remain submerged, and resistance to mechanical damage comprising a polymeric tube encased in a flexible metal sheath of the type commonly used in electrical installations.

7 Claims, 1 Drawing Sheet

AERATION SYSTEM AND METHOD

This is a continuation-in-part of Application No. 07/979,929 filed Nov. 20, 1992, now abandoned.

BACKGROUND OF THE INVENTION

This invention relates to systems for aerating lakes and ponds, as well as to equipment for use in such systems.

Many bodies of water that are used for recreational or water supply purposes (e.g., lakes, ponds, rivers, lagoons, bays, or reservoirs) often become eutrophic, a condition characterized by an abundant accumulation of nutrients that support a dense growth of plant and animal life, the decay of which releases nitrogen and phosphorus, depleting the waters of oxygen. For convenience herein, in both the description of the invention and the claims that define it, all such bodies of water will be deemed to be included in the term "lakes."

There are many commercial pieces of equipment that aerate or oxygenate eutrophic lakes by supplying air from a land-based compressor to an air release location on the lake bottom, where the air is allowed to bubble to the surface of the water. In currently preferred systems, the air is transmitted through a hose to a diffuser positioned on the floor of the lake, where small bubbles are released and rise to the surface, creating turbulent, or preferably laminar, flow of the water. This aeration helps rejuvenate lakes by eliminating algae, oxidizing debris on the lake bottom, and helps restore the lake to usable condition.

Prior to the present invention, many attempts have been made to find a suitable air transport hose, which must be heavy enough to stay submerged when filled with air, capable of resisting snagging on fishing lines or the propellers of outboard motors, and desirably possess rodent repellence. One commercially used hose has been a high density rubber that has an outside diameter (o.d.) of 15/16 inch (about 24 mm) and an inside diameter (i.d.) of 9/16 inch (about 14 mm), preferably treated with muskrat repellent. This hose is bulky, expensive, susceptible to snagging, and has a high coefficient of friction with respect to the air passing through it.

Another commercially used hose is a vinyl tube having an o.d. of about 15 mm and an i.d. of about 12.5 mm, along the length of which is attached a vinyl-encased lead wire. Although having a low coefficient of friction with respect to the transported air, this type of hose is susceptible to kinking, which may go undetected, thus reducing the ability of air to pass through it. Further, lead is an undesirable—even illegal in some parts of the country—metal to be placed in a lake. It is also believed that the vinyl sheath may be appealing to the muskrats that inhabit many lakes and streams, increasing the possibility that the lead may become exposed and dissolve in the water.

Still another technique has been to use tubing made of high density polyethylene or unplasticized polyvinyl chloride for air transport, attaching brick weights at intervals along its length. This type of arrangement is labor intensive, and since the bricks become entrapped in the sediment on the bottom of the lake, it is difficult to move or replace the hose. Further, the hose itself is potentially susceptible to rodent attack.

BRIEF SUMMARY

The present invention provides a simple and inexpensive solution to the problem of supplying air from a land-based compressor to a diffuser on the bottom of a eutrophic lake. An air transport hose is provided that has a low coefficient of friction with respect to transported air, sufficient weight to remain on the lake bottom without employing lead as ballast, extraordinary resistance to snagging or severing, and inherent ability to resist rodent attack.

The present invention features a novel air transport hose, comprising an imperforate polymeric tube (high density polyethylene tubing, which possesses the desirable properties of strength, rigidity, and low cost, being currently preferred) surrounded by a flexible metal member; other suitable materials for forming the polymeric tube include isotactic polypropylene, ABS polymer, and unplasticized polyvinyl chloride. The polymeric tube should be impervious to water and is preferably both continuous and seamless. The flexible metal member may be, e.g., a spirally wound wire sufficiently heavy to create a hose that, when filled with air, has a density greater than that of water. Preferably, however, the flexible metal member is a sheath comprising a flexible spiral galvanized conduit of the type commonly used in electrical installations. Such conduits are conventionally made by winding a metal strip about a mandrel and folding the strip longitudinally so that the edge portions of each convolution of the strip overlap and interlock with folded edge portions of the preceding and succeeding convolutions. There is a limited amount of freedom of axial movement in each interlock, so that the conduit may be axially extended from a position of minimum length, in which succeeding convolutions are in contact with each other, to a position of maximum length, in which the convolutions are prevented from further separation by the interlocks. The ability of the convolutions to move axially provides flexibility to the conduit, permitting opening of the convolutions on the convex side of a bend and closing of the convolutions on the concave side. In a currently preferred embodiment, the conduit is itself rendered liquid tight according to Underwriter Laboratories standards by including an elastomeric strand within the interlocks and encasing the conduit in plasticized polyvinyl chloride, e.g., as taught in Kinander U.S. Pat. No. 3,311,133.

In manufacturing air transport hoses utilizing flexible metal conduit of the type described in the preceding paragraph, strips of the metal are wrapped around a semi-rigid polymeric tube, which substitutes for the mandrel normally used in the manufacture of electrical conduit. The interior of the semi-rigid tubing has a low coefficient of friction with respect to air, a desirable feature.

BRIEF DESCRIPTION OF THE DRAWINGS

Understanding of the invention will be enhanced by referring to the accompanying drawings, in which like numbers refer to like parts in the two views, and in which.

DETAILED DESCRIPTION

Figure 1:
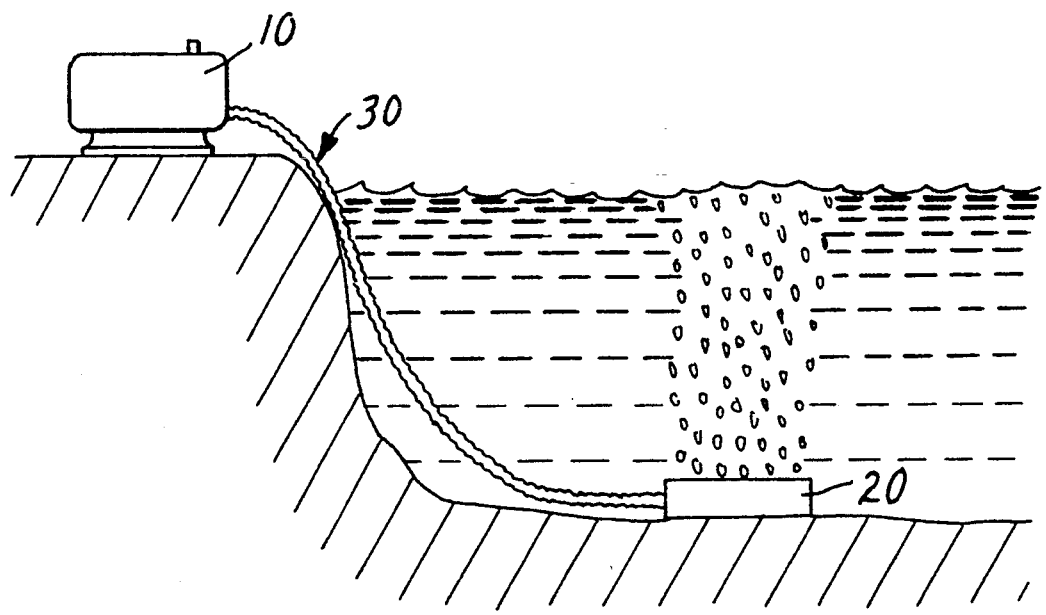
FIG. 1 depicts an aeration system using the novel air transport hose of the invention.
Figure 2:
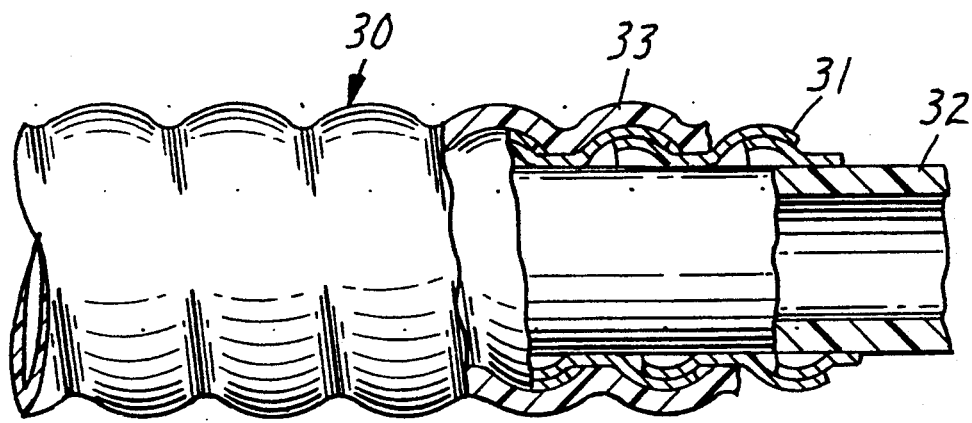
FIG. 2 is an enlarged view of the air transport hose of the invention, with certain parts broken away and shown in cross-section to facilitate understanding.

In the drawing, compressor 10 is based on the shore of a lake, with diffuser 20 located on the lake floor, air transport hose 30 supplying air from compressor 10 to diffuser 20. Hose 30 comprises flexible metal sheath 31 surrounding polymeric tube 32; typical i.d. and o.d for tube 32 are respectively about 12.5 mm and 15 mm Sheath 31 is in turn protectively covered by vinyl jacket 33 which helps protect the metal against the attack of acidic or brackish water. The interior of tube 32 is smooth and offers minimal friction to air flowing through it. Sheath 31 is sufficiently heavy to ensure that hose 30 will remain on the floor of a lake or other body of water, meanwhile being sturdy enough to resist snagging, inadvertent severing, or rodent attack. The presence of metal sheath 31 also permits the use of higher pressure, as may be required when water is deep or when the distance between the compressor and the diffuser is long, e.g., half a mile (on the order of 800 meters). Protective flexible polymeric jacket 33, which is optional but preferred, offers protection against corrosion of metal sheath 31 by the surrounding water and also makes hose 30 more attractive and convenient to handle. Jacket 33 is preferably a seamless coating of plasticized polyvinyl chloride, although other flexible polymeric coatings could be used.

What is claimed is as follows:

1. In an aeration system for use in rejuvenating eutrophic lakes, comprising a compressor, a diffuser located on the floor of the lake, and a hose connecting the two, the improvement wherein the hose is an imperforate polymeric tube that, when filled with air, is lighter than water, said tube being protectively surrounded by a flexible metal member that is formed from a spirally wound interlocking flexible strip, whereby the interior of the hose has a low coefficient of friction with respect to transported air and the hose is rendered heavy enough to remain on a lake bottom, strong enough to resist high pressures, resistant to rodent attack, and heavy enough to remain on a lake bottom, even when filled with air.

2. The system of claim 1 wherein the polymeric tube is formed of high density polyethylene.

3. The system of claim 2 wherein the flexible metal member is surrounded by a flexible, seamless polymeric coating.

4. An improved method of transporting air from a compressor to a diffuser on the floor of a eutrophic lake, comprising connecting the diffuser to the compressor by a hose that is an imperforate polymeric tube protectively surrounded by a flexible metal member that is formed from a spirally wound interlocking flexible strip, the interior of the hose having a low coefficient of friction with respect to transported air and the metal member being sufficiently heavy to maintain the hose submerged when air is being transported therethrough.

5. The method of claim 4 wherein the polymeric tube is formed from high density polyethylene.

6. The method of claim 5 wherein the flexible metal member is formed from a spirally wound interlocking flexible strip, thereby rendering the hose resistant to snagging or severing.

7. The method of claim 6 wherein the flexible metal member is covered by a flexible polymeric coating, thereby reducing the possibility of water's entering the metal member.

\* \* \* \* \*